Nov. 7, 1950 M. E. HARDY 2,529,019

TWO-SPEED TURNTABLE DRIVE

Filed Feb. 25, 1949 3 Sheets-Sheet 1

MAURICE E. HARDY
*INVENTOR.*

BY Bruce S. Bricker

HIS AGENT

Nov. 7, 1950 M. E. HARDY 2,529,019

TWO-SPEED TURNTABLE DRIVE

Filed Feb. 25, 1949 3 Sheets-Sheet 2

MAURICE E. HARDY
*INVENTOR.*

BY [signature]

HIS AGENT

Nov. 7, 1950 M. E. HARDY 2,529,019

TWO-SPEED TURNTABLE DRIVE

Filed Feb. 25, 1949 3 Sheets-Sheet 3

MAURICE E. HARDY
*INVENTOR.*

BY [signature]

HIS AGENT

Patented Nov. 7, 1950

2,529,019

UNITED STATES PATENT OFFICE 2,529,019

TWO-SPEED TURNTABLE DRIVE

Maurice E. Hardy, Chicago, Ill., assignor to Zenith Radio Corporation, a corporation of Illinois Application February 25, 1949, Serial No. 78,385

6 Claims. (Cl. 74—190)

This invention relates to an improved record player and more particularly to such a record player adapted to reproduce the standard 78 R. P. M. recordings as well as the micro-groove, 33⅓ R. P. M. long playing recordings.

With the advent of the long playing or "L. P." recordings, the need for a player of such recordings arose. In order to accommodate those persons possessing collections of both the standard recordings and the long playing recordings, a record player adapted to play each of the two types of recordings was required. It is recognized that mechanisms for the playing of both 78 R. P. M. recordings and 33⅓ R. P. M. transcriptions have long been used in radio broadcasting stations. However, these mechanisms are usually quite complex, rather expensive and generally unavailable to the public. The need for a simple and inexpensive record player available to the general public is thus apparent.

It is an object of this invention, therefore, to provide an improved multi-speed record player which is simple and inexpensive to construct.

It is another object of this invention to provide a record player in which constant speed of rotation can be maintained selectively at 78 R. P. M. and at 33⅓ R. P. M., and in which turntable rumble is minimized.

It is a further object of this invention to provide a record player incorporating a record changing mechanism and a pair of tone arms, each of which is designed to engage respectively, the grooves of standard 78 R. P. M. recordings and of 33⅓ R. P. M. micro-groove recordings.

In accordance with the invention the record player includes a rotatable turntable having first and second annular driven surfaces of different diameters. The record player also includes a driving motor and a gear system between the driving motor and the driven surfaces, which gear system includes at least one displaceable gear for selectively completing a driving connection from the motor to one of the driven surfaces. A control member is provided which is mechanically coupled to the displaceable gear for effecting displacement thereof, selectively to interconnect the motor and one of the driven surfaces, to effect rotation of the turntable at one of two predetermined speeds.

The features of the present invention, which are believed to be novel, are set forth with particularity in the appended claims. The present invention, both as to its organization and manner of operation, together with further objects and advantages thereof, may best be understood, however, by referring to the following description taken in connection with the accompanying drawings in which:

Figure 1:
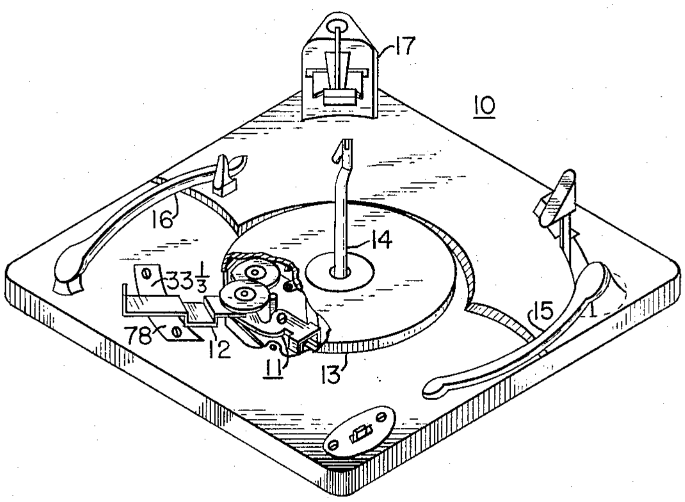
Figure 1 shows an isometric view of a record player incorporating the invention and in which a portion of the turntable is shown cut-away.

Referring to Figure 1 of the drawings, there is shown a record player 10 having a driving mechanism 11, a control lever 12, a turntable 13, a turntable spindle 14, a tone arm 15, a tone arm 16 and the side post of a record changing mechanism 17.

Neglecting for a moment the operation of the driving mechanism 11, turntable 13 is driven at a rotational speed of either 78 R. P. M. or 33⅓ R. P. M., depending on the position of manually operated control lever 12. For 78 R. P. M. operation, a switching arrangement described hereinafter, electrically connects a tone arm 15 with a conventional audio amplifier (not shown) and places the record changing apparatus 17 in operating condition. The record changing apparatus 17 may be, for example, of the type illustrated in the copending application of Kurt Emde and Ralph A. Mullaney, Serial No. 639,067, filed January 4, 1946, for Record Changing Means. Tone arm 15 is provided with a stylus and a cooperating transducer element (not shown) designed to reproduce the recorded information available on the standard 78 R. P. M. recordings. For operation at 33⅓ R. P. M. the control lever 12 is shifted manually to the proper position. The turntable then rotates at 33⅓ R. P. M. and the switching arrangement disconnects tone arm 15 and connects tone arm 16 to the audio amplifier (not shown) and renders record changer 17 inoperative. Tone arm 16 is provided with a stylus and a cooperating transducer element (not shown) for reproduction of the information recorded on the long playing, micro-groove, recordings.

*Operation at 78 R. P. M.*

Figure 2:
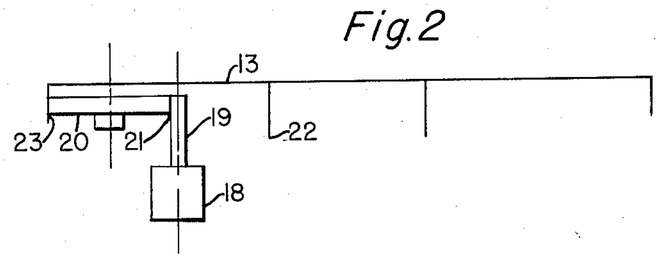
Figure 2 shows a simplified sketch of the driving connection between the driving motor and turntable for a first rotational speed.

Referring now to Figure 2 for a description of the driving arrangement for the turntable, there is represented a synchronous constant speed driving motor 18, a motor shaft 19, an idler wheel 20 having a peripheral rim 21 and driving flanges 22 and 23 of different diameters projecting downwardly from the turntable. It is to be understood that this figure in no way represents the physical position and dimensional scale of the component elements, but merely illustrates the driving relationship therebetween. The motor shaft 19 is frictionally coupled to the peripheral rim 21 of idler wheel 20 which, in turn, is in frictional driving engagement with the inner side of driving flange 23 thereby completing the driving connection to turntable 13.

Figure 3:
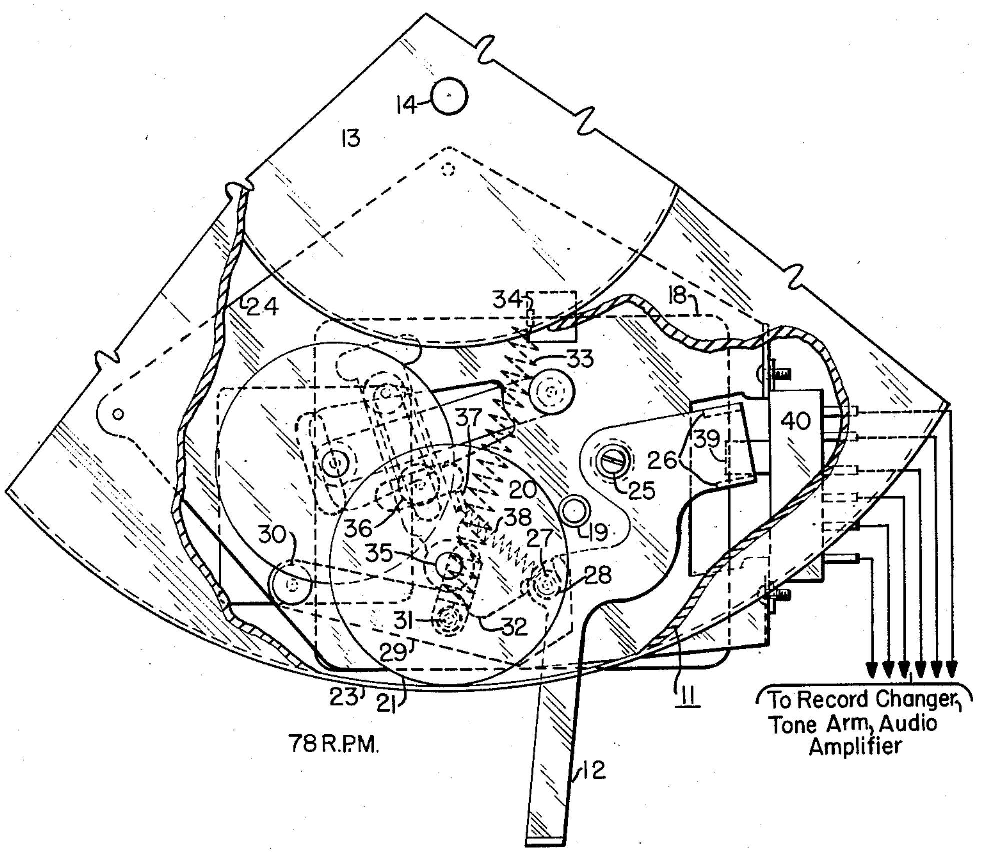
Figure 3 shows a detailed diagram of a portion of a turntable and of the driving connection between driving motor and turntable for the first rotational speed, a portion of the turntable being shown cut-away.
Figure 5:
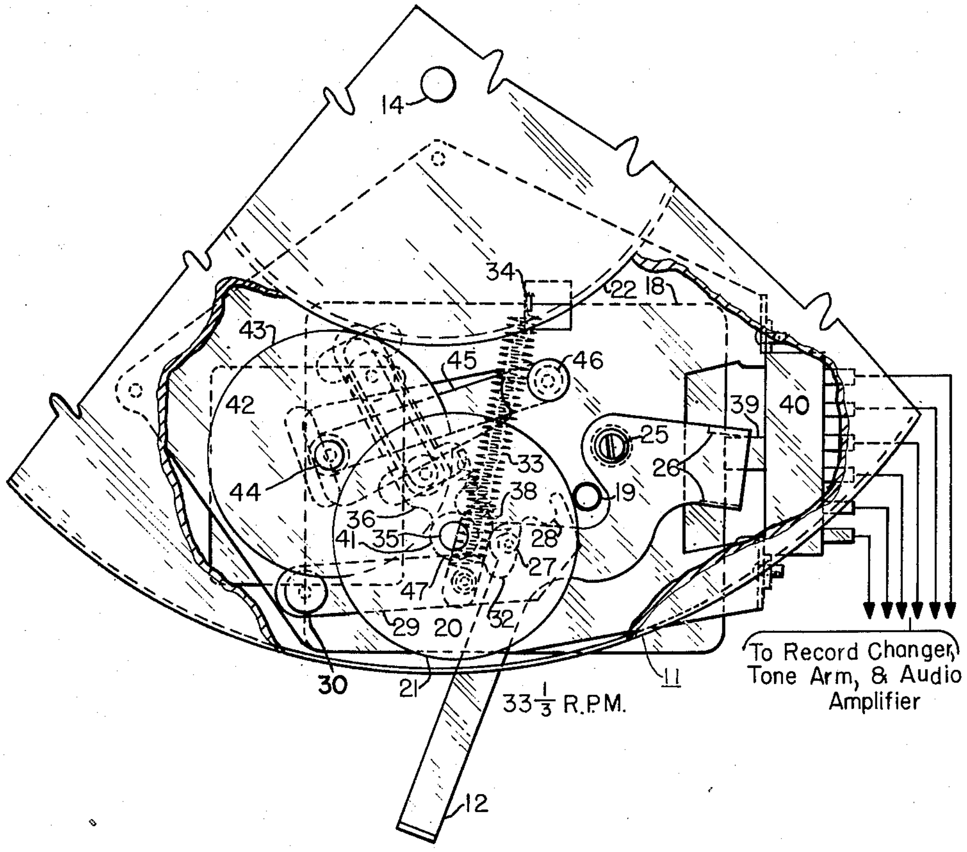
Figure 5 shows a detailed diagram of a portion of a turntable and of the driving connection between driving motor and turntable for the second rotational speed, a portion of the turntable being shown cut-away.

Referring now to Figure 3, there is shown the driving mechanism 11 which includes a mounting plate 24 supporting the driving motor 18, shown in outline. Motor shaft 19 drives turntable 13 through the peripheral rim 21 of idler 20. Control lever 12 is pivoted at a point 25, and has positioned thereon switch operating ears 26 one of which is shown to be in engagement with an operating lever 39 of a switch 40. A detent engaging pin 27, shown to be engaged with a detent 28 of a detent arm 29, is positioned on lever 12. Detent arm 29 is pivoted at a point 30 and includes a spring terminal 31 and a second detent 32. A spring 33 is extended between spring terminal 31 on detent arm 29 and another spring terminal 34 positioned on mounting plate 24. Idler wheel 20 is rotatably mounted on a shaft 35, which shaft is affixed to a linkage 36. Linkage 36 includes a spring terminal 37 from which a spring 38 is extended to detent pin 27. Assuming control lever 12 is in a position as shown in Fig. 5 and is manually displaced clockwise about pivot point 25, detent pin 27 rides from a position near detent 32 along detent arm 29 and the arm is pivoted about point 30 until detent pin 27 engages detent 28. The tension of spring 33, applied to detent arm 29, maintains detent 28 in firm engagement with detent pin 27. This movement of control lever 12 places one of integral ears 26 into engagement with lever 39 of switch 40 which is thereby actuated to make certain electrical circuit changes as will be more fully described in connection with the discussion of Figure 6.

Linkage 36 affords two degrees of movement in a horizontal plane for shaft 35 of idler wheel 20. On counter-clockwise movement of control lever 12, detent engaging pin 27, which forms one of the two terminals for spring 38, is displaced in a direction away from spring terminal 37 of linkage 36. Thus, a spring tension is applied to spring terminal 37 which urges linkage 36 in a direction toward spring terminal 27. Since idler wheel 20 is mounted on linkage 36, movement thereof is restricted by the peripheral rim 21 of idler wheel 20 which is firmly wedged between drive shaft 19 and flange 23. By proper selection of the related dimensions of these elements, the synchronous motor 18 drives the turntable 13 at a rotational speed of 78 R. P. M.

*Operation at 33⅓ R. P. M.*

Figure 4:
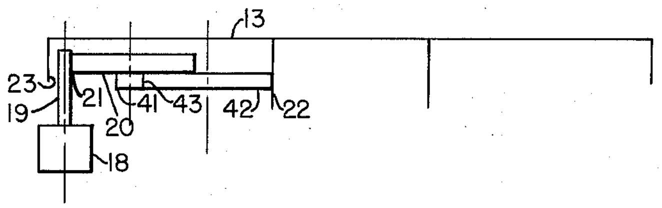
Figure 4 shows a simplified sketch of the driving connection between driving motor and turntable for a second, slower, rotational speed.

Referring now to Figure 4, there is shown another driving connection of turntable 13 with synchronous, constant speed, driving motor 18. This simplified sketch shows the driving motor 18, the motor shaft 19, idler wheel 20 having a concentric shouldered portion 41 of reduced diameter, an idler wheel 42 having a peripheral rim 43 and depending driving flanges 22 and 23. It is to be understood that this figure is a functional one and in no way represents the actual physical position and dimensional scale of the component elements. Motor shaft 19 is frictionally coupled to the peripheral rim 21 of idler wheel 20, which idler wheel is in direct driving relationship with shouldered portion 41. The peripheral rim 43 of idler 42 is coupled between shouldered portion 41 and the outer side of driving flange 22.

Figure 5 is another fragmentary view of the driving mechanism, showing essentially the same elements as represented in Figure 3, but arranged in a different relation required to effect driving of the turntable at a modified speed. Like elements in the views are designated by the same reference characters. There is also shown a shouldered portion 41 of idler wheel 20 and idler wheel 42 having a peripheral rim 43. A shaft 44 of idler wheel 42 is positioned at one end of an arm 45 which is pivoted at its other end about point 46. Detent arm 29 is shown to be in engagement with shaft 35 at a point designated as contact point 47.

Assuming control lever 12 is displaced manually, from the position shown in Figure 3, in a direction which provides clockwise rotation of the lever about point 25, detent pin 27 is forced out of engagement with detent 28 of detent arm 29. The tension of spring 33 urges detent arm 29 to rotate about point 30 and thereby causes detent 32 to approach pin 27. This movement of control lever 12 releases the tension of spring 38 and thus completely frees linkage 36 making shaft 35 freely movable in a horizontal plane. Also, this movement of control lever 12 places another one of ears 26 into engagement with lever 39 of switch 40 which is thereby actuated to make certain electrical changes as will be more fully described in connection with the discussion of Figure 6.

In this condition of operation, spring 33 applies a bias which maintains frictional engagement among the various component elements. Detent arm 29, as a result of the tension of spring 33, is biased into engagement with shaft 35 at contact point 47 and thus urges the concentric coaxial, displaceable gears 20 and 41 into engagement with motor shaft 19 and with idler 42 respectively. The peripheral rim 21 of idler wheel 20, engages motor shaft 19 and shouldered portion 41 engages peripheral rim 43 of idler 42. Since shaft 44 of idler wheel 42 is rotatably movable in a horizontal plane about point 46 of arm 45, idler 42 is urged into frictional engagement at its peripheral rim 43 with the outer side of driving flange 22. It is thus apparent that motor shaft 19 is coupled to flange 22 through a frictionally operative gear train and by proper selection of the related dimensions of the component elements, synchronous motor 18 drives turntable 13 at a speed of 33⅓ R. P. M. It is to be noted that for 78 R. P. M. operation, as described in connection with Figures 2 and 3, shaft 44 of idler 42 is freely movable and idler 42 is not urged into engagement with any of the elements of the system.

Although the invention has been described as affording rotation of the turntable at the selected speeds of 33⅓ R. P. M. and 78 R. P. M., it is apparent that the system is operable at a selected one of any two rotational speeds. This can be accomplished by constructing the various elements of proportions related to the selected speeds of rotation.

*Change-over switch operation*

Figure 6:
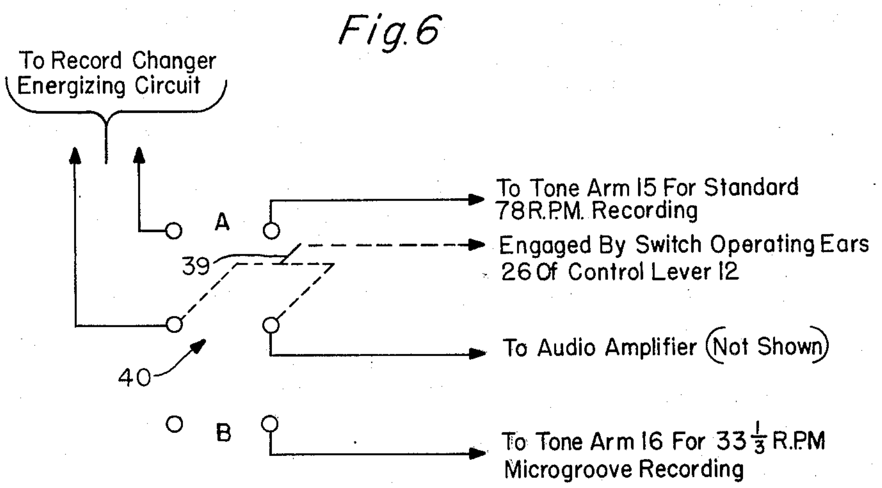
Figure 6 shows a schematic representation of the switch connections, for the switch shown in Figures 3 and 5.

Referring now to Figure 6, the circuit connections to switch 40 are illustrated. Operating lever 39 is displaced by operating ears 26 of control lever 12 and thus the position of this lever depends on the position of control lever 12. For the condition of operation at 78 R. P. M., operating lever 39 and its associated blades are carried to a position designated by the letter A. The record changer energizing circuit is thus completed for record changer 17 (Figure 1) and tone arm 15 (Figure 1) is electrically connected to the input of the audio amplifier (not shown). The system is thus operable for the automatic playing of standard 78 R. P. M. recordings. For the condition of operation at 33⅓ R. P. M., control lever 12 is displaced to the proper position and one of the switch operating ears 26 carries lever 39 of switch 40 to a position B. The record changer energizing circuit is opened, rendering the record changer inoperative, tone arm 15 is disconnected from the input of the audio amplifier (not shown) and tone arm 16 is connected thereto. The system is thus conditioned for the playing of the 33⅓ R. P. M. micro-groove "L. P." recordings.

It can be seen that the arrangement of Figure 1 is a simple and novel device achieving constant speed of rotation at both 78 R. P. M. and 33⅓ R. P. M. It has been shown that for operation at 33⅓ R. P. M. the motor is coupled to one of the turntable driving flanges through two idler wheels, each having a peripheral rim of a resilient or vibration absorbing material. Therefore, any extraneous vibration or rumbling which might exist in the motor is substantially absorbed and the turntable is smoothly and quietly driven at the proper speed. Also, since the unit requires relatively few, easily manufactured parts, the record player is inexpensive to construct. By incorporating in a record player a record changer, a pair of tone arms and a two speed driving mechanism all on a common mounting base, convenient reproducing means are afforded for both standard 78 R. P. M. recordings and 33⅓ R. P. M. "L. P." recordings.

While a particular embodiment of the present invention has been shown and described, it is apparent that changes and modifications may be made without distinguishing from this invention in its broader aspects and, therefore, the aim in the appended claims is to cover such changes and modifications as fall within the true spirit and scope of this invention.

I claim:

1. A record player comprising: a rotatable turntable having first and second annular driven surfaces of different diameters; a driving motor; a gear system intermediate said motor and said driven surfaces and including an idler gear in the plane of the first one of said driven surfaces as well as a pair of coaxial displaceable gears, one of said displaceable gears being in the plane of said idler gear and the other being in the plane of the second one of said driven surfaces; and a control member mechanically coupled to said displaceable gears for selectively positioning said gears in a first position, wherein said one gear mechanically connects said motor to said first driven surface through said idler gear, and in a second position wherein said other gear mechanically connects said motor to said second driven surface.

2. A record player comprising: a rotatable turntable having first and second annular driven surfaces of different diameters; a driving motor; a gear system intermediate said motor and said driven surfaces and including an idler gear in the plane of the first one of said driven surfaces as well as a pair of coaxial displaceable gears of different diameters, one of said displaceable gears being in the plane of said idler gear and the other being in the plane of the second one of said driven surfaces; and a control member mechanically coupled to said displaceable gears for selectively positioning said gears in a first position, wherein said one gear mechanically connects said motor to said first driven surface through said idler gear, and in a second position wherein said other gear mechanically connects said motor to said second driven surface.

3. A record player comprising: a rotatable turntable having a first annular driven surface and a second annular driven surface of a diameter greater than said first surface; a driving motor; a gear system intermediate said motor and said driven surfaces and including an idler gear in the plane of the first one of said driven surfaces as well as a pair of coaxial displaceable gears, one of said displaceable gears being in the plane of said idler gear and the other being in the plane of the second one of said driven surfaces and of a diameter greater than said one displaceable gear; and a control member mechanically coupled to said displaceable gears for selectively positioning said gears in a first position, wherein said one gear mechanically connects said motor to said first driven surface through said idler gear, and in a second position wherein said other gear mechanically connects said motor to said second driven surface.

4. A record player comprising: a rotatable turntable having first and second annular driven surfaces of different diameters; a driving motor; a gear system intermediate said motor and said driven surfaces and including an idler gear in the plane of the first one of said driven surfaces as well as a pair of coaxial displaceable gears of different diameters, mounted on a common shaft in continuous driving relation with respect to said motor, one of said displaceable gears being in the plane of said idler gear and the other being in the plane of the second one of said driven surfaces; and a control member mechanically coupled to said common shaft for selectively positioning said gears in a first position, wherein said one gear mechanically connects said motor to said first driven surface through said idler gear, and in a second position wherein said other gear mechanically connects said motor to said second driven surface.

5. A record player comprising: a rotatable turntable having a first annular driven surface and a second annular driven surface of a diameter greater than said first surface; a driving motor; a gear system intermediate said motor and said driven surfaces and including a movable idler gear in the plane of the first one of said driven surfaces as well as a pair of coaxial displaceable gears, one of said displaceable gears being in the plane of said idler gear and the other being in the plane of the second one of said driven surfaces and of a diameter greater than said one displaceable gear; and a control member mechanically coupled to said displaceable gears for selectively positioning said gears in a first position, wherein said one gear mechanically connects said motor to said idler gear, and advances said idler gear into driving engagement with said first driven surface and in a second position wherein said other gear mechanically connects said motor to said second driven surface.

6. A record player comprising: a rotatable turntable having first and second annular driven surfaces of different diameters; a driving motor having a driving shaft; a gear system intermediate said motor and said driven surfaces and including an idler gear in the plane of the first one of said driven surfaces as well as a pair of coaxial displaceable gears of different diameters mounted on a common shaft in continuous driving relation with respect to said motor, one of said displaceable gears being in the plane of said idler gear and the other being in the plane of the second one of said driven surfaces; and a control member mechanically coupled to said common shaft for selectively rotating said gears about said motor driving shaft as a center of rotation to a first position, wherein said one gear mechanically connects said motor to said first driven surface through said idler gear, and to a second position wherein said other gear mechanically connects said motor to said second driven surface.

MAURICE E. HARDY.

REFERENCES CITED

The following references are of record in the file of this patent:

UNITED STATES PATENTS

| Number | Name | Date |
|---|---|---|
| 904,723 | Reeves | Nov. 24, 1908 |
| 964,141 | Astrup | July 10, 1910 |
| 1,877,707 | Weil | Sept. 13, 1932 |
| 2,113,401 | Goldsmith | Apr. 5, 1938 |
| 2,260,319 | Hoehn | Oct. 28, 1941 |
| 2,328,703 | Beewar | Sept. 7, 1943 |